United States Patent [19]

Kanotz et al.

[11] Patent Number: 4,493,747
[45] Date of Patent: Jan. 15, 1985

[54] METHOD FOR INSULATING CONDUCTORS WITH A CRYSTALLINE PLASTIC MATERIAL

[75] Inventors: William M. Kanotz, Baldwin; William C. Vesperman, Bel Air; Max K. Wilson, Cockeysville, all of Md.

[73] Assignee: AT&T Technologies, Inc., New York, N.Y.

[21] Appl. No.: 528,667

[22] Filed: Sep. 2, 1983

Related U.S. Application Data

[63] Continuation-in-part of Ser. No. 342,990, Jan. 27, 1982, abandoned.

[51] Int. Cl.³ .......................................... B32B 31/14
[52] U.S. Cl. ................................ 156/64; 156/244.12; 156/244.23; 156/244.24; 156/498; 156/500; 264/174; 264/176 R; 425/113; 425/392; 425/516
[58] Field of Search ............... 156/64, 244.23, 244.24; 264/176 R

[56] References Cited

U.S. PATENT DOCUMENTS

| | | |
|---|---|---|
| 2,920,351 | 1/1960 | Hardesty et al. |
| 3,024,497 | 3/1962 | Hardesty et al. |
| 3,037,068 | 5/1962 | Wessel ................................ 174/69 |
| 3,227,786 | 1/1966 | Cohen ................................ 264/174 |
| 3,270,977 | 9/1966 | Tillou .................................. 242/82 |
| 3,346,921 | 10/1967 | Bunish et al. ..................... 425/113 |
| 3,553,042 | 1/1971 | Cocco. |
| 3,890,416 | 6/1975 | Bauer et al. ...................... 264/45.5 |
| 3,946,097 | 3/1976 | Takahashi et al. ................ 264/102 |
| 4,061,461 | 12/1977 | Hessenthaler .................... 425/462 |
| 4,082,585 | 4/1978 | Kanotz et al. ...................... 156/51 |
| 4,090,763 | 5/1978 | Congdon et al. ............. 339/103 M |
| 4,172,106 | 10/1979 | Lewis ................................. 264/209 |
| 4,206,011 | 6/1980 | Kanotz et al. .................... 156/498 |
| 4,339,298 | 7/1982 | Kanotz et al. .................... 156/498 |

*Primary Examiner*—Caleb Weston
*Attorney, Agent, or Firm*—E. W. Somers

[57] ABSTRACT

An extrusion system is provided for covering a conductor (14) with a crystalline thermoplastic elastomer insulating material. The plastic material is tubed onto the conductor by apparatus which includes a core tube (61) that is mounted in an extruder crosshead (41) such that its free end is positioned within the interior of a die (81, 101) and is spaced from an orifice of the die a predetermined percentage of the land length of the die. A flow passage between the core tube (61) and a wall which defines the die cavity is controlled in accordance with the relative value of the thermal energy which is released by the insulating material at the onset of crystallization. In one arrangement, which has been found to be suitable for a crystalline thermoplastic elastomer having a relatively high value of released thermal energy, the die cavity and the core tube are arranged to provide a gradually converging path toward the die opening. For an insulating material having a relatively low value of released thermal energy, the flow passage is modified to provide a diverging portion (105) and then a rapidly converging portion (110) which communicates with the land of the die.

10 Claims, 7 Drawing Figures

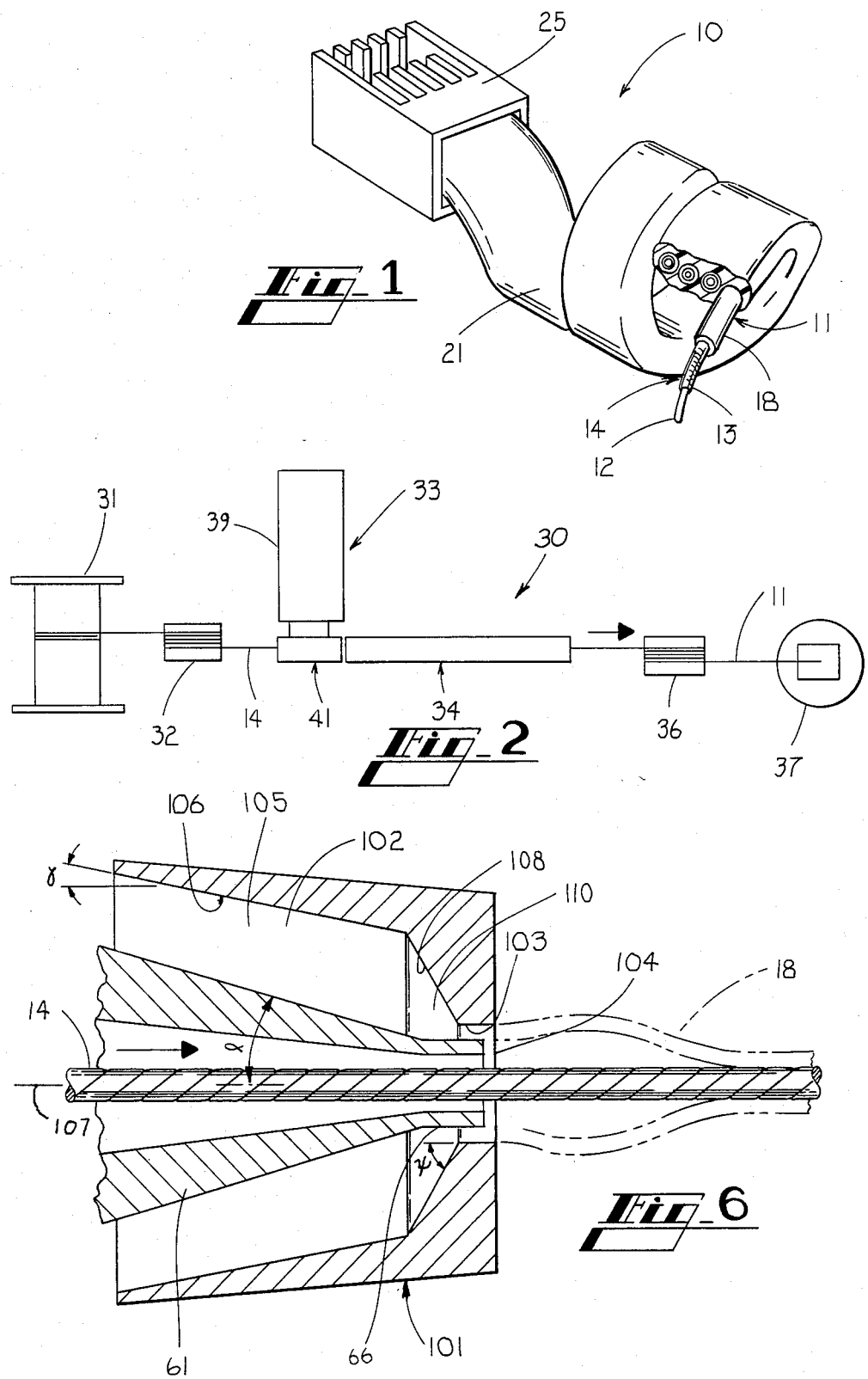

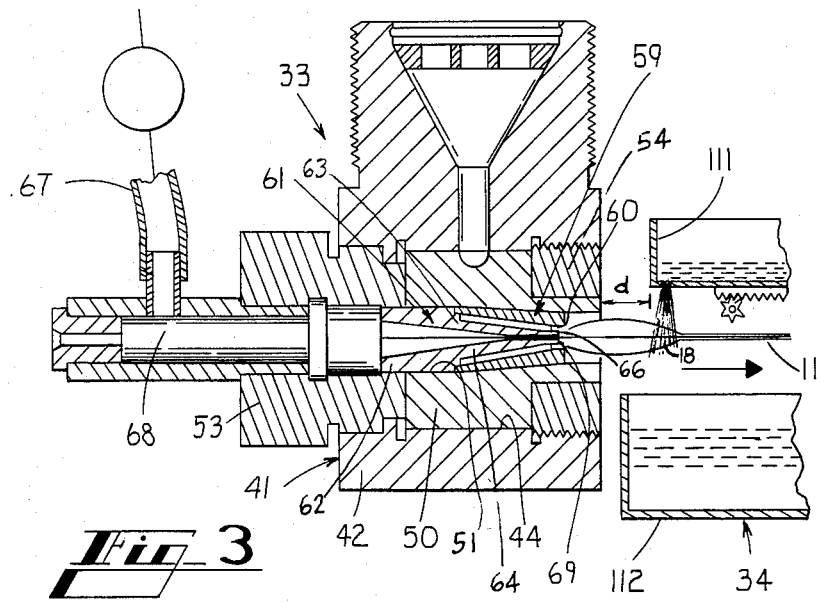
Fig_3
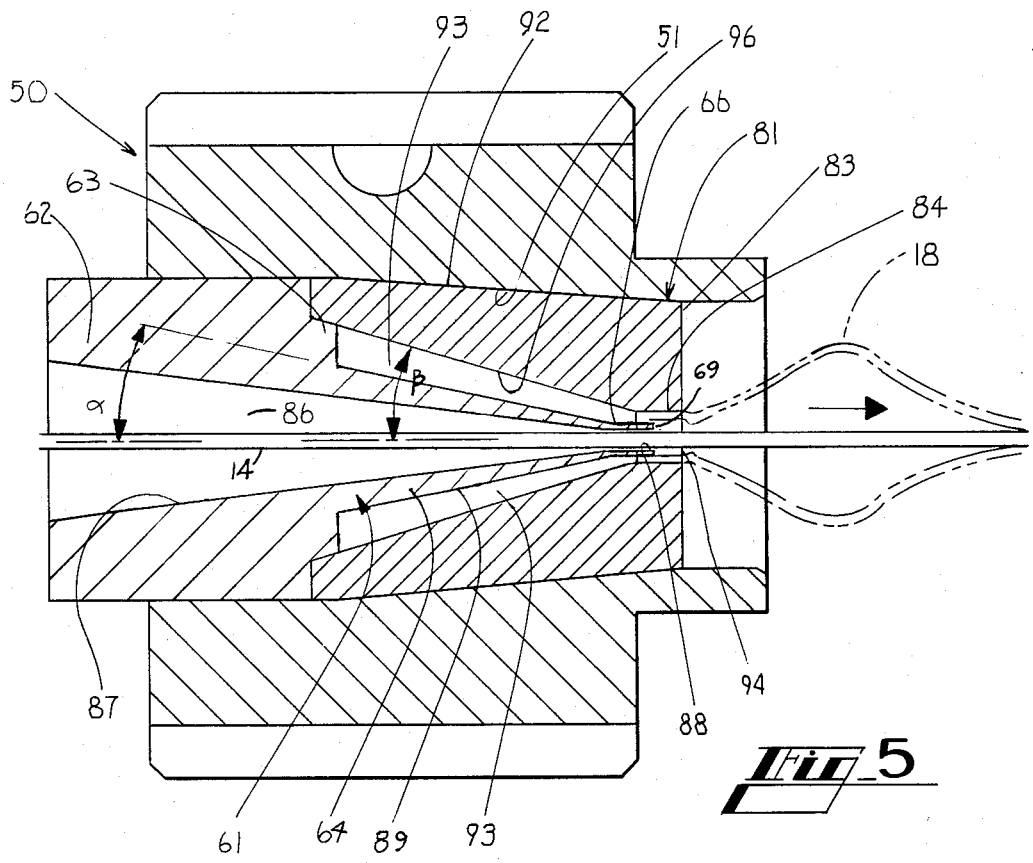
Fig_5

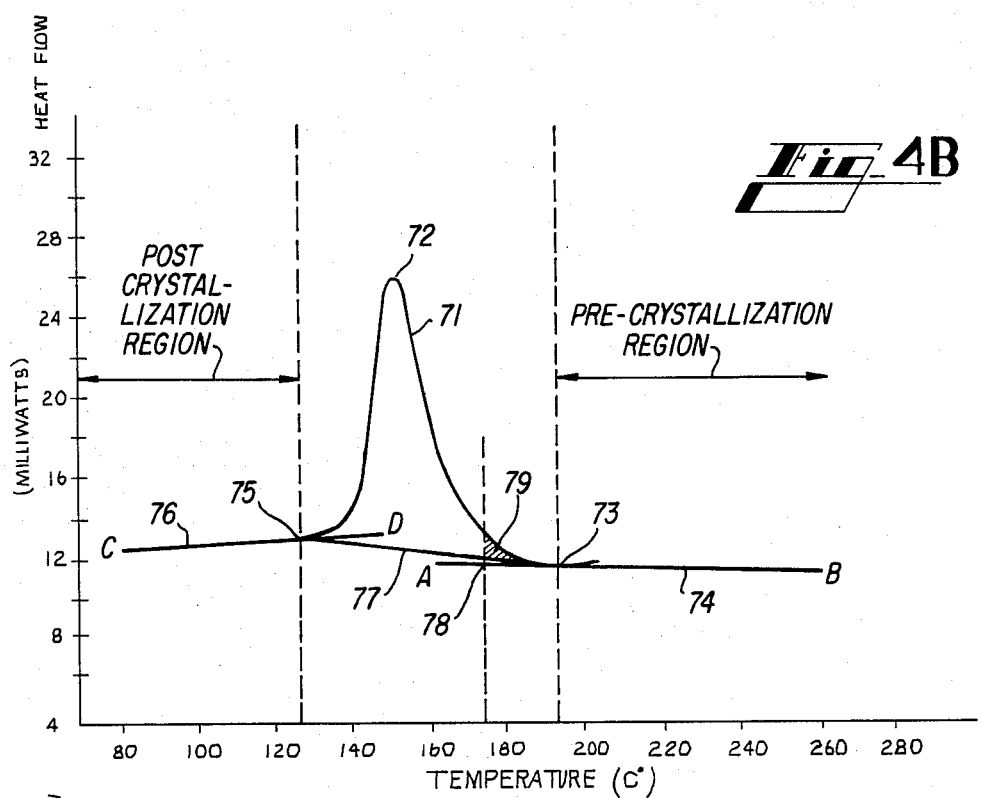
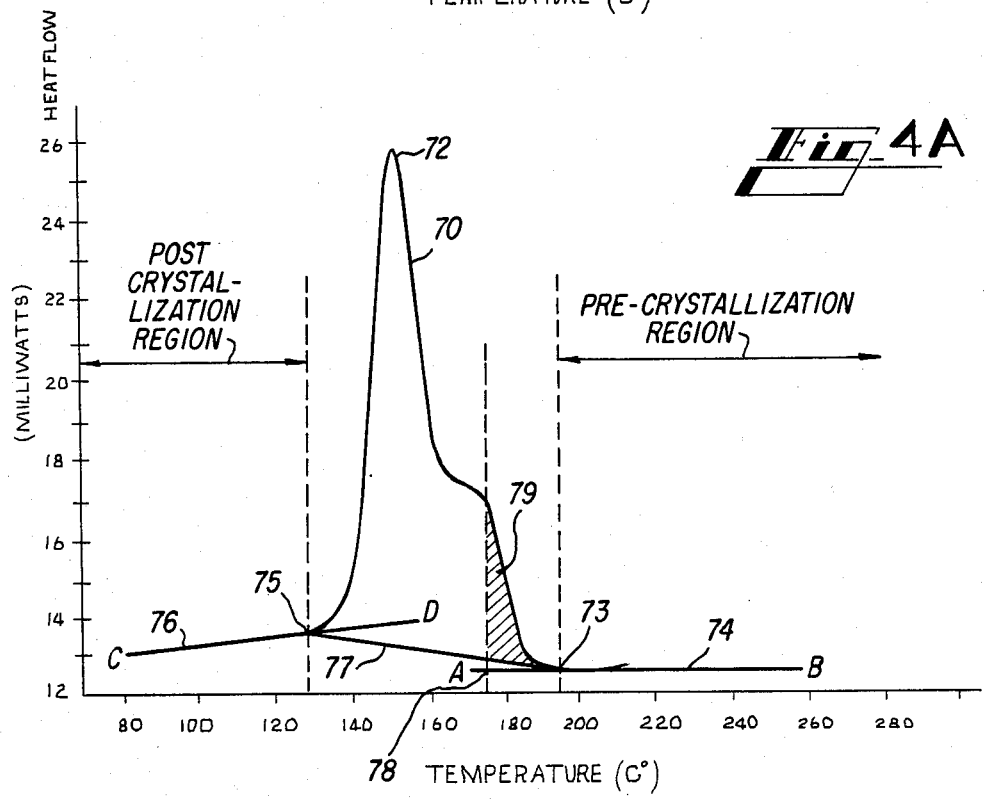

METHOD FOR INSULATING CONDUCTORS WITH A CRYSTALLINE PLASTIC MATERIAL

This is a continuation-in-part of application Ser. No. 06/342,990, filed Jan. 27, 1982, now abandoned.

TECHNICAL FIELD

This invention relates to methods of and apparatus for insulating conductors with a crystalline plastic material. More particularly, it relates to methods of and apparatus for covering a conductor, which comprises a plurality of tinsel ribbons that are wrapped about a filamentary core, with a crystalline thermoplastic elastomer material.

BACKGROUND OF THE INVENTION

A telephone cord which connects a telephone handset to a telephone base generally comprises a polymeric core having a plurality of tinsel ribbons wrapped helically thereabout. In the past, tinsel conductors were covered with a nylon knit and then insulated with an extruded polyvinyl chloride (PVC) composition. A plurality of individually insulated conductors were jacketed with a plasticized PVC composition. See U.S. Pat. No. 3,037,068 which issued on May 29, 1962 in the name of H. L. Wessel.

In a somewhat recently introduced cord connection arrangement, which is referred to as modularity, miniature plugs are connected to each end of a line or spring cord to facilitate attachment to jacks in telephone instruments and in wall outlets. For example, see U.S. Pat. Nos. 3,699,498 and 3,761,869 issued Oct. 17, 1972 and Sept. 25, 1973 respectively in the names of E. C. Hardesty, C. L. Krumreich, A. E. Mulbarger, Jr., and S. W. Walden and in U.S. Pat. No. 4,148,359 issued Apr. 10, 1979 in the name of E. C. Hardesty, all incorporated by reference hereinto.

With the introduction of modularity, it became necessary to use a different cord construction because of a need for a smaller cross-section to be compatible with the miniature plugs. In order to reduce the size of the insulated conductor, the plasticized nylon covering over the served tinsel was replaced with a crystalline thermoplastic elastomer as disclosed and claimed in U.S. Pat. No. 4,090,763 which issued on May 23, 1978 in the names of W. I. Congdon, J. J. Mottine and W. C. Vesperman and which is incorporated by reference hereinto. A material such as that disclosed and claimed in the above-identified Congdon et al patent is available commercially from E. I. duPont Company under the trade name HYTREL ® polyester elastomer.

Typically, insulation over tinsel conductors is formed by an extrusion process which is referred to as tubing such as is disclosed, for example, in U.S. Pat. No. 3,553,042, which issued on Jan. 5, 1971 in the name of E. R. Cocco and which is incorporated by reference hereinto. The tubing process causes a plastic extrudate which is to form the insulation to enclose but to be spaced from the tinsel conductors to provide for relative movement therebetween, thus adding to the flexibility and to the life of the telephone cord. In a typical tubing operation, the free end of a core tube in an extruder crosshead is at least flush with or extends beyond the vicinity of a die opening.

The prior art also shows techniques for controlling the engagement of the tubed, crystalline plastic extrudate with the core being enclosed. In U.S. Pat. No. 4,206,011, which issued on June 3, 1980 in the names of W. M. Kanotz, W. A. Lockhart, George F. Piper, W. C. Vesperman, and M. K. Wilson and which is incorporated by reference hereinto, an extruded tubular covering is held out of contact with an advancing conductor until the extrudate becomes sufficiently form-sustaining by suitable crystallization. Then when the crystallized insulation is drawn down on the conductor, any tinsel burrs which protrude outwardly are compressed. This prevents any protuberances in the outside surface of the insulation and results in a conductor having a continuously concentric insulation and a substantially uniform wall thickness.

One problem that has surfaced during the use of crystalline thermoplastic elastomer as an insulation cover relates to the extrusion process. As the extrudate emerges from the die opening, prematurely crystallized portions of the plastic material which are called crystallites and which may have formed somewhere between the extruder screw and the die opening adhere to the surface of the conventional protruding or flush free end of the core tube. These small portions further crystallize, break off and form lumps in the conductor insulation, or they may continue to accumulate and result in large masses which adhere to the extruder tooling.

In an apparatus which is disclosed and claimed in Application Ser. No. 229,434 which was filed on Jan. 29, 1981 in the names of W. M. Kanotz et al, and now U.S. Pat. No. 4,339,298 the core tube is positioned in a die cavity of the extruder crosshead such that a free end of the core tube is recessed within the die opening. Such an arrangement prevents the accumulation of crystallites in the vicinity of the die opening by eliminating potential collection sites for prematurely crystallized portions of the plastic material. While this last-identified arrangement in combination with the flow passage for the plastic material as shown in abovementioned U.S. Pat. No. 4,206,011 has been found to be suitable for some batches of a plastic material, it has resulted in unacceptable insulation when other batches of the same plastic material are used.

What is needed and what the prior art has not provided is an extruder tooling arrangement which is controlled to extrude acceptable insulation as among successive batches of a crystalline thermoplastic elastomer type plastic material. Such an arrangement must be one which does not sacrifice any of the qualities of prior art tooling for extruding this highly crystalline material.

SUMMARY OF THE INVENTION

The foregoing problem of covering a tinsel conductor by tubing a crystalline plastic material has been overcome by the methods and the apparatus of this invention. A conductor which includes a core having a plurality of tinsel ribbons wrapped thereabout is advanced through an extruder that includes a core tube having a free end which is recessed within a land of a die opening of a crosshead of the extruder. Successive increments of length of the tinsel conductor are enclosed in an insulation cover which comprises a crystalline thermoplastic elastomer. The underflush core tube prevents any build up of crystallites in the vicinity of the die opening by eliminating potential collection sites for prematurely crystallized portions of the thermoplastic material and avoids defects in the insulation cover.

The crystallization temperatures and the initial rate of crystallization of the plastic material are identified and its processing is controlled by controlling the extruder tooling which includes a die and a core tube to optimize the properties of the plastic material. The die and the core tube are adapted to provide a specially configured flow passage between the wall which defines the die cavity and the outer surface of the core tube. The configuration of the flow passage is controlled in accordance with relative value of the thermal energy which is released by the plastic material at the onset of crystallization as measured over a defined temperature range. This parameter is referred to as the onset crystallization energy (OCE). For a plastic material having a relatively high onset crystallization energy, it is a flow passage which converges continually and gradually to the die land. This causes the plastic material to be moved rapidly out of the die. On the other hand, for a relatively low initial rate, the flow passage diverges and then abruptly converges to the land. The diverging portion provides a reservoir of the plastic material for feeding the abruptly converging portion. The plastic material is rapidly accelerated through the abruptly converging portion and the molecular orientation of the plastic material is enhanced to strengthen it.

The thermoplastic material which is moved past the recessed, free end of the core tube flows inwardly toward the advancing conductor, and then is caused to be moved outwardly from the tinsel conductor for a predetermined time. The expansion of the extrudate is effective to cool the extrudate and to further molecularly orient the thermoplastic material which enhances its crystalline growth. Then the insulation cover is drawn down concentrically about the tinsel conductor while the plastic material which comprises the insulation cover is further cooled.

BRIEF DESCRIPTION OF THE DRAWINGS

Other objects and features of the present invention will be more readily understood from the following detailed description of specific embodiments thereof when read in conjunction with the accompanying drawings, in which:

FIG. 1 is a perspective view of a telephone cord which comprises tinsel conductors that are insulated with the apparatus of this invention and shows one end of the cord terminated with a modular plug;

FIG. 2 is a view of an overall manufacturing facility, in schematic form, embodying the principles of this invention for producing insulated tinsel conductors;

FIG. 3 is an enlarged view of a portion of the apparatus shown in FIG. 2 and shows portions of an extruder crosshead and of cooling facilities;

FIGS. 4A and 4B are graphs which depict cooling curves for several batches of a crystalline plastic material;

FIG. 5 is an enlarged detail view of a portion of the extruder die and core tube of this invention which is used to extrude crystalline plastic materials having relatively high onset crystallization energy, and FIG. 6 is an enlarged view of a portion of a tubing arrangement of this invention which is used to extrude crystalline plastic materials having a relatively low initial rate of crystallization.

DETAILED DESCRIPTION

Referring now to the drawings, and particularly FIG. 1 thereof, there is shown a retractile or spring cord, designated generally by the numeral 10, which includes a plurality of insulated tinsel conductors 11-11. Each of the insulated tinsel conductors 11-11 includes a nylon multi-filament center core 12 about which a plurality of tinsel ribbons 13-13, made typically from a Phosphor-bronze material, are wrapped spirally to form a tinsel conductor 14. An insulating cover 18 of a suitable plastic material is extrusion tubed over the tinsel conductor 14 to form one of the insulated tinsel conductors 11-11.

The insulation 18 is tubed over the tinsel conductor 14 such that an air-induced space between the tinsel conductor and the insulation allows the conductor to move freely within the insulation thereby reducing conductor fatigue. With an average conductor outside diameter of about 0.05 cm and the size limitation imposed by a modular-terminated cord 10, the tubular insulation 18 has an outside diameter typically on the order of about 0.095 cm. The criticality of the outside diameter coupled with approximately a 0.002 cm air space, necessitates a tubular wall thickness of about 0.019 cm. This relatively thin wall construction mandates that the insulation material possess excellent mechanical strength, such as, for example, cut-through resistance, suitable hardness and suitable tensile and compressive strengths.

A plurality of the insulated tinsel conductors 11-11 are arranged in parallel, nontwisted, contiguous relationship with respect to each other and enclosed in a jacket 21 (see FIG. 1) which is comprised, for example, of a plasticized polyvinyl chloride composition. Subsequently, the cord 10 is completed by attaching a modular plug 25 to one or both ends thereof.

The insulated conductor 11 is disclosed and claimed in priorly identified U.S. Pat. No. 4,090,763 and the plastic material which comprises the insulation 18 is a crystalline thermoplastic elastomer. An insulation composition suitable for constructing the cord 10 is available presently from the E. I. duPont de Nemours and Company, Inc., of Wilmington, Del., under the trade designation HYTREL ® polyester elastomer material. Extrusion of the thermoplastic elastomer composition is affected by extrusion temperatures and screw design since the insulation composition is characterized by rapid changes in melt viscosity and melt strength with slight variations of polymer temperature.

The crystalline plastic material which comprises the insulation 18 is one whose crystallization nucleation or initiation temperature is capable of being substantially near to its melting point temperature. The insulation 18 is characterized by crystalline growth within a defined temperature range when cooled below the melt point temperature of the thermoplastic elastomer which is in the range of approximately 218° C. to 220° C. The crystalline growth makes possible the extrusion of a tubing about the irregular tinsel conductor while developing strength and rigidity so that when the tubed insulation is moved into proximate engagement with the conductor, it is capable of compressing any burrs upstanding from the tinsel ribbons.

Referring now to FIG. 2 of the drawings, there is shown a simplified schematic view of a system, designated generally by the numeral 30, for producing tinsel conductors 11-11 covered with the insulation 18. The system 30 includes a supply 31 of a tinsel conductor 14, an accumulator 32, an extruder, designated generally by the numeral 33 for tubing the insulation cover 18 over the tinsel conductor 14, a cooling system 34, a capstan 36 and a takeup 37. The supply 31, the accumulator 32, the cooling system 34, the capstan 36, and the takeup 37 are all of conventional design and are well-known in the art. In a conventional tubing operation, the insulation 18 is drawn down on the conductor 14 as the conductor is advanced out of the extruder 33 since the conductor is being advanced at a higher rate than that at which the extrudate is issuing from the extruder.

The extruder 33 includes a barrel 39 in which is mounted a screw of the type of example shown in U.S. Pat. No. 3,579,608, which is incorporated by reference hereinto. The screw is rotated by suitable source of power (not shown) for the purpose of forcing the thermoplastic elastomer material through an extruder crosshead, designated generally by the numeral 41. The crosshead 41 comprises a body member 42 (see FIG. 3) provided with an opening which forms a continuation of the bore in the barrel 39. The opening communicates with a cylindrical bore 44 formed in the body member 42 transversely with respect to the barrel.

A cylindrical tool holder 50 having a central bore 51 which extends coaxially with respect to the bore 44 is removably mounted in the body member 42 by a back head nut 53 and an adapter nut 54. The tool holder 50 supports a die 59 having a cylindrical land 60 and mounts a core tube 61 in axial alignment with the die 59. The land 60 is a portion of the die 59 through which a cavity of the die communicates with an exit orifice and along which the flow and pressure of the plastic material about the substrate being covered are stabilized. The land may be cylindrical or tapered or a combination thereof.

The tool holder 50 is designed to deflect the plastic insulation material from a direction flowing downwardly as viewed in FIG. 3 to a direction flowing to the right around the core tube 61 and through the die 59 to form the covering 18 concentrically around the tinsel conductor 14 being advanced therethrough. Referring to FIG. 3, it is seen that the core tube 61 includes a stepped cylindrical shape having an enlarged base portion 62, a second portion 63, having a reduced diameter, and a tapered conical portion 64 culminating in a cylindrical portion 66.

The plastic material which comprises the insulation 18 is a crystalline material in which crystalline growth occurs in the range of about 60° C. to about 216° C. In order to resist disfiguration of the outward profile of the insulated conductor 11 by irregularities in the tinsel conductor 14, it is most advantageous to provide for substantial crystalline growth and development of sufficient melt strength in the plastic material prior to the plastic material being caused to assume its ultimate position relative to the tinsel conductor. This may be accomplished by extruding the plastic material at a temperature slightly above but as close as possible to its melting point, i.e., 218° C. to 220° C. and by spacing the extrudate from the tinsel conductor 14 (see FIG. 3) for a predetermined time sufficient to obtain a desired crystal growth and development of melt strength. See priorly identified U.S. Pat. No. 4,206,611. Typically, the temperature of the melt at the extruder die opening is about 224° C. which although just a few degrees less than in the extruder barrel increases the melt viscosity because of the steepness of the graph of its viscosity versus temperature.

The initial over-spacing of the HYTREL ® insulation from the tinsel conductor is accomplished with an arrangement shown in FIG. 3. A gaseous medium such as, for example, air at a pressure of about $1.4 \times 10^5$ newtons/m$^2$ is introduced through a flow rate meter at a volume rate of about 4.7 to $6.3 \times 10^5$ m$^3$/sec. The air flows through a tube 67 into an opening which communicates with a passageway 68 into the core tube 61. The air which is driven under pressure toward the downstream or exit end of the extruder crosshead 41 exits out from the extremity of the core tube which protrudes into the land 60.

The core tube 61 in cooperation with the air causes the HYTREL ® insulation to "balloon" or expand outwardly from the tinsel conductor as shown in FIG. 3. Then, after the conductor 14 is advanced through a predetermined distance at a specific line speed which is sufficient for crystalline growth of the HYTREL ® insulation to be maximized, the polymer is drawn down about the conductor.

The introduction of the air into the core tube 61 to expand the insulation cover 18 for a short distance downstream of the die opening 59 stresses the insulation. This causes a molecular orientation to occur within the copolymer material. Crystalline polymers such as, for example, the HYTREL ® copolymer exhibit improved strength and flexibility when they have been treated in a manner to orient the polymer molecules. This result is referred to as orientation-enhanced crystallizeability. It should be noted that the air is used to expand and molecularly orient the copolymer while extruding the copolymer at a temperature slightly above, but as close as possible to, the melting pointing of the copolymer extrudate. If the copolymer extrudate is extruded at a temperature substantially higher than the melting point of the copolymer, crystalline growth may be inhibited and any attempt to expand the extrudate would most likely rupture the insulation 14.

The introduction of the air into the core tube 61 to expand the extrudate outwardly from the tinsel conductor 14 also, advantageously, cools the extrudate below the melt temperature at the die opening 59. This is of assistance in causing the temperature of the polymer to decrease to facilitate the crystalline growth.

It has been found that for insulated conductors 11-11 of the size contemplated for modularity, a normal tubing operation is not adequate to control the dimensions of the insulation 18 and provide a specific wall thickness. Moreover, a HYTREL ® plastic material tends to vary in consistency thereby necessitating a greater degree of control. In order to overcome the problem of collection sites for crystallites, i.e., premature crystallized portions, the extruder tooling of priorly identified Ser. No. 229,434 filed on Jan. 29, 1981, and now U.S. Pat. No. 4,339,298 is used. Therein, a free end 69 of the core tube 61 is recessed within the land 60 of the die 59 instead of extending therepast. This eliminates collection sites for the plastic material which initially moves inwardly toward the tinsel conductor 14 and then outwardly by air supplied through the core tube 61. Crystallites may continue to form on the external surface of the core tube 61 but since they do so in the land length of the die which is the zone of highest pressure in the crosshead, they are continuously and immediately wiped off. In other words, the ability of the plastic to adhere to and to accumulate on the surface of the core tube is substantially inhibited because of the elimination of potention collection sites.

The problem of extruding a consistently suitable insulation from a plurality of batches of the same composition plastic material is overcome by testing the material to characterize the crystalline nature of the material and by providing tooling in accordance with the results of the testing.

In the prior art, the crystalline characteristics of the plastic material were determined in an after-the-fact manner, i.e. during the initial extrusion of the material. These characteristics together with associated extrudate characteristics and observations during subsequent extrusion runs were then utilized to characterize the plastic material and to use suitable tooling.

A new analytical procedure has been developed to characterize the crystalline nature of a particular batch of crystalline plastic material as received from a supplier in order to predict processing behavior and thereby allow suitable design of extrusion tooling.

A differential scanning calorimeter (DSC) is used to perform the analytical procedure. In this procedure, utilizing the D.S.C., a weighed ten to twelve mg sample of the crystalline material is placed in an open aluminum sample pan. A "static" atmosphere of "air" at standard temperature and pressure (STP) is used to blanket the sample during the procedure. The sample is then heated to a temperature of 270° C. at a rate of $10\pm1°$ C./minute and held at this temperature for a period of two minutes. The melted sample is then cooled to a temperature of 80° C. at a rate of $30\pm5°$ C./minute. The resolidified sample again is remelted by heating it to a temperature of 270° C. using a heating rate of $10\pm1°$ C./minute. The sample again is held at a temperature of 270° C. for a two minute period. Finally, the sample is cooled to 80° C. using a cooling rate of $30\pm5°$ C./minute.

Differential scanning calorimetry (DSC) thermograms which are referred to as second pass cooling curves are generated using the above procedure for each batch of crystalline plastic material to be extruded. Exothermic second pass cooling curves or thermograms 70 and 71 of heat flow versus temperature for two crystalline plastic materials are shown in FIGS. 4A and 4B. Typically, each includes a peak 72 at approximately 155° C. The peak 72 of each curve indicates the temperature at which the maximum crystallization rate occurs. The crystallization onset temperature (COT), which is designated 73 in FIGS. 4A and 4B is defined as that point where the slope of the individual thermogram deviates from a line AB which is designated 74. The line 74 is defined as that straight line most closely approximating the linear portion of the pre-crystallization region of the thermogram which represents the second pass cooling curve. The crystallization termination temperature (CTT), which is designated by the numeral 75, in FIGS. 4A and 4B, is defined as that point where the slope of the thermogram deviates from a line CD which is designated 76. The line 76 is defined as a straight line most closely approximating the linear portion of the post-crystallization region of the thermogram representing the second pass of the cooling curve. By connecting point 73 (COT) and point 75 (CTT), a base line 77 is generated.

Each thermogram is integrated above the base line 77, between the limits of the crystallization onset temperature (COT) and a line through a point 78 which represents the crystallization onset temperature less 15° C. and which is designated COT', to obtain an area 79. This area 79 is defined as the "onset crystallization energy" (OCE). It represents the quantity of thermal energy released which is associated with the crystallization of the plastic material at an upper temperature range. The greater the energy released, the more rapidly the plastic material crystallizes. A significantly larger area (OCE) is obtained from the integration of the second pass cooling thermogram 70 shown in FIG. 4A as compared to that for the thermogram 71 shown in FIG. 4B. Accordingly, it can be said that the crystalline plastic material for which the thermogram 70 was generated releases significantly more energy during the onset of crystallization than that for the thermogram 71.

The use of a parameter referred to as the "onset crystallization energy" (OCE) allows a user to distinguish between crystalline plastic materials having like compositions but exhibiting significant differences in crystallization behavior. This analytical procedure accurately predicts the extrusion processing differences exhibited by the two specific samples. Consequently, it allows a user to characterize each incoming lot of crystalline plastic material in order to predict its processing behavior because of the variability in extrusion performance experienced from lot to lot.

Heretofore, differences in the two crystalline plastic samples were not indicated by any slope, curve shape, or area differentials of the thermograms generated by prior art procedures. Significant differences are found between accepted prior art tests and the procedure described hereinbefore for determining differences among crystalline plastic materials. At least one accepted test utilizes nitrogen as the atmospheric gas rather than air. Also, the gas of the environment in which the testing is conducted is static whereas a prior art procedure specifies a flow rate of $9\pm1$ cm$^3$/min. Further of importance is the use of the second cooling cycle for determining differences among crystalline materials.

As mentioned hereinbefore, the onset crystallization energy is indicative of the percent of the plastic material which crystallizes at upper temperature ranges. A high value of this parameter indicates that there is a relatively high percentage of the plastic material which crystallizes at the upper temperature range and that its mechanical strength increases at a relatively rapid rate. As a result, its flow passage through the extruder should be such that the plastic material is flowed quickly out of the extruder. For a material having a relatively low value, the flow passage should be such as to afford the plastic material the opportunity to remain for a longer period within the extruder to allow it to crystallize and increase in strength.

Based on the results of this procedure and on the comparison of the onset crystallization energy of a particular batch of plastic material with standard values, a user is able to provide a suitable tooling arrangement. For example, for the plastic material for which the curve 70 was generated, the plastic material crystallizes rapidly and requires the use of tooling such as is shown in FIG. 5. On the other hand, the plastic material with which the curve 71 is associated has a relatively low rate of crystallization at upper temperature ranges and tooling such as is shown in FIG. 6 is recommended.

If the tooling of U.S. Pat. No. 4,206,011 were to be used for a material associated with the curve shown in FIG. 4A, the material would begin to crystallize within the die cavity and result in lumps in the insulation. What is needed is an extruder tooling arrangement in which the plastic material is moved out of the die as quickly as possible. Should the cooling curves as generated in an air atmosphere reveal a high proportion of crystallized material at higher temperatures, the flow passage between the wall of the die cavity and the outer surface of the core tube is arranged to continually and gradually accelerated the flow to prevent crystallite build-up in the extruder tooling.

Referring to FIG. 5, there is shown in detail the core tube and die arrangement of this invention which is used to extrude a thermoplastic elastomer such as that shown in the curve 20 of FIG. 4A which has a relatively high onset crystallization energy. For this embodiment, the die is designated generally by the numeral 81 while the core tube remains designated as 61. The core tube 61 is supported in the bore 51 in the crosshead 41 such that the free end 69 of the cylindical portion 66 does not extend to an outwardly facing surface 83 of the crosshead to which the die 81 opens. The free or unsupported end 69 of the core tube 61 is positioned within a land 84 of the die 81. More particularly, the free end of the core tube 61 is positioned so that it is in the range of about 30 to 50% of the land length "L" of the die 59 from the external face 83 of the die. The die land 84 has a length as measured in a direction along the path of travel of the conductor in the range of about 0.20 to about 0.25 cm.

The core tube 61 is constructed with a tapered bore 86 extending through the portions 62–64 and defined by an inner surface 87. Typically an angle $\alpha$ between an outer surface 89 of the core tube 61 and its centerline is in the range of about 7° to 9°. The bore 86 communicates with a cylindrical bore 88 which opens to the interior of the die 81 along the land 84 thereof.

The die holder 50 includes the bore 51 which is defined by a surface or bearing wall 92. The die 81 is supported in engagement with the surface 91 and includes a cavity 93 that has a frustoconical configuration and that converges at some predetermined angle toward the land or throat 84 adjacent an opening 94 of the die 81. Typically, an angle 62 is formed between a line of generation of a wall 96 which defines the cavity 93 and the centerline of the core tube 61.

Inasmuch as the energy released by the plastic material at the onset of crystallization to be extruded by the apparatus of FIG. 5 is initially high, the flow path in the extruder crosshead is streamlined. Otherwise the plastic material would be permitted to form masses of prematurely crystallized material within the extruder crosshead and would be nonextrudable or unexceptable as insulation. It should be observed from FIG. 5 that the configuration of the cavity 93 adjacent to the die opening cooperates with the core tube 61 to provide a streamlined flow path for the plastic insulating material. With the angle $\alpha$ of about 7° to 9° between the centerline of the core tube 61 and its outer surface 89, it has been found that the angle $\beta$ between the centerline of the core tube and the surface 96 of the die should be in the range of about 15° to 30° for an elastomer having a relatively high initial rate of crystallization. The velocity of the plastic increases as it approaches the die 81 which contributes to the wiping action along the tip of the core tube 61 and the inhibiting of any build up of crystallites thereon.

The plastic material flows between the wall 96 of the die cavity 93 and a frustoconical portion of the surface 89 of the core tube 61 which are spaced apart in a converging direction (see FIG. 5). The plastic material flows at a high velocity to the end face of the core tube 61 and the pressure of the material on all sides of the portion of the core tube is balanced. The conductor 14 is guided from the core tube 61 substantially in alignment with the cylindrical passage through the land 84 of the die 81. It is centered generally within the extrudate as it is advanced out of the cylindrical bore 88 and the insulation cover material is extruded through the cylindrical passage in the die.

These arrangements result in a continuously concentric insulated conductor for a plastic material having a relatively high release of energy at the onset of crystallization. The controlled flow passage insures that the time within the die cavity 93 is suitable in view of the crystallization characteristics of the plastic material being extruded. The recessing of the tip of the core tube 61 within the land 84 of the die 81 prevents any accumulation of extrudate since any plastic which engages the surface of the core tube is continuously wiped therefrom.

The core tube and die arrangement of this invention is also a departure from the prior art with respect the the land 84 of the die 81 in combination with the flow passage and the underflush core tube. Because crystalline materials tend to slough off on the land surface as they are moved through the die, the lands of dies which have been used in the art to extrude crystalline materials over relatively small diameter strands have a length, e.g., about 0.10 cm, which is substantially less than that of the land 84 of this invention. However, in the apparatus of this invention, the crystallization of the plastic material is partially complete as it is moved through the land 84 which avoids any build up. Advantageously, this stabilizes the flow in the vicinity of the die opening notwithstanding the underflush position of the free end of the core tube 61.

In the event that the cooling curve appears as that shown in FIG. 4B, the release of energy at the onset of crystallization of the plastic material is relatively low. Consequently, the die and core tube arrangement must be such as to provide for additional molecular orientation of the elastomer before it is tubed over the conductor 14 in order to improve a generally lower melt strength. It has been found that the low crystallization rate plastic material can be successfully extruded by changing the configuration of the die cavity 93. The core tube 61 and the portion of its free end within the die land remains the same as when extruding the higher crystallization rate plastic material. Accordingly, the core tube in the embodiment of this invention shown in FIG. 6 remains designated as 61, but the numeric designation of portions of the die differ from those in FIG. 5.

A die 101 is constructed with a cavity 102 having two portions each of which has a frustoconical configuration that converges at some predetermined angle toward a land or throat 103 adjacent an opening 104 of the die. In conventional extruders, the angle formed between a line of generation of a wall which defines the cavity 102 and the centerline of the core tube 61, which is referred to as the angle of attack, is on the order or magnitude of 15° to 30°. Information relating to typical angles of attack may be found, for example, on page 117 of Wire and Cable Coaters' Handbook as published by the E. I. duPont Company in 1968.

The above-mentioned angles of attack are not suitable for plastic materials such as HYTREL ® insulation having a relatively low release of energy at the onset of crystallization. For those, it was determined that the flow passage in the die cavity 102 must be formed with two portions, one in which its defining wall converges gradually toward the land 103 of the die and the other in which its defining wall converges abruptly toward the land. A first portion 105 of the die cavity 102 is defined by a wall 106 having a line of generation which makes an angle $\gamma$ in the range of 8° to 10° with an axis 107 of the core tube 61. The other portion 110 of the die cavity 102 is defined by an end wall 108 which makes an angle $\psi$ in the range of about 60° to 75° with the axis 107. Preferably an angle $\psi$ of 63° would be used to extrude successfully the HYTREL® insulation 18 about the tinsel conductor 14. The first portion 105 of the flow passage diverges whereas the second portion 110 abruptly converges.

The plastic material flows between the wall 106 of die cavity 102 and the frustoconical portion 64 of the core tube 61 which are spaced apart in a diverging direction (see FIG. 6). The plastic material flows at a high velocity toward the end face of the core tube 61. Just to the left of the end wall 108, as viewed in FIG. 6, the cross-sectional area of the flow channel is greater than that prior thereto in the diverging portions of the die and the core tube 61. In the next portion of the die cavity 102, the wall 108 abruptly converges to the land 103 while the core tube configuration is continually converging to the constant diameter section 66. The die cavity 102 is effective to provide for an accelerated flow of the plastic material which orients and thereby strengthens the extrudate.

The configuration of the second portion 110 of the die cavity 102 having an unusually large angle of attack results in an acceptable extrusion of the insulation. This result is achieved notwithstanding the creation of the enlarged space which is called a retention chamber or reservoir at the juncture between the two portions 105 and 110 of the die cavity 102. It should be apparent from FIG. 6 that the space would appear to result in the extrudate being retained within the die for a period of time during which crystallites could form and block the extrusion. However, the accelerated flow from the junction of the two portions of the die cavity provided by the rapidly converging wall 108 over a distance of about 0.32 cm avoids any formation of crystallites. The rapidly accelerated flow in the abruptly converging portion 110 is fed from the reservoir created by the diverging portion 105. As a result, the molecular orientation of the plastic material is enhanced. Advantageously, this increases the strength properties of the extrudate.

The explanation for the unexpected success of the die construction described hereinabove in FIG. 6 relates to the control of the flow passage in accordance with a low energy release at the onset of crystallization. The HYTREL® material must be provided with a flow path along which it it begins to develop its crystallization cycle. For a material which has a relatively low energy release at the onset of crystallization, the dual flow passage comprising a diverging and an abruptly converging portion is suitable. For plastic materials having a relatively high energy release at the onset of crystallization, this arrangement is not suitable; instead, a single stage, gradually converging flow passage is needed.

With the underflush positioning of the core tube 61, it has been found that higher air volumetric flow rates must be injected between the core tube and extrudate than in prior art arrangements in order to insure the movement of the extrudate out of the die opening. An increased volumetric flow rate for the injected air provides advantages with respect to the molecular orientation of the crystalline material. The increased pressure causes the cone of extrudate to be held out of engagement with the conductor 14 for a longer period of time which results in an improved crystalline structure having increased strength with which to compress any tinsel flaws.

The use of the core tube and die arrangement of this invention for tube-extruding a crystalline thermoplastic elastomer produces an extrudate that does not tear or break apart as it passes the tip of the core tube. As the plastic material leaves the passageway between the tip of the core tube 61 and the die wall, it flows inwardly for a short distance before it is ballooned outwardly (see FIG. 3). The apparatus of this invention results in a smooth uninterrupted flow of the plastic first inwardly toward the advancing conductor 14 and then outwardly to maximize crystalline growth before it forms the insulation cover about the conductor. As will be recalled, the air injection is effective to cool the copolymer and promote crystalline growth, as well as to orient the molecular structure of the copolymer by subjecting it to strain, which enhances the crystalline growth.

The crystallized insulation material has suitable strength to overcome any upstanding tinsel slivers and to compress them toward engagement with the configuration of the tinsel conductor. Moreover, as the insulation 18 assumes its generally final position relative to the tinsel conductor with about a 0.0002 cm air space therebetween, it has sufficient melt strength to stretch over any burrs or lumps of metal of considerable size which may occur on the tinsel without rupture. Advantageously, this results in a continuous reliably configured insulated tinsel conductor 14 which obviates the necessity for a rewind operation to repair torn portions.

Subsequently, the insulated tinsel conductor 14 is advanced along a path through the treating facilities 34 (see FIGS. 2 and 3) whereat the insulation is treated with a fluid, e.g., water, to cause the insulation to be cooled in a predetermined manner. The treating facility 34 typically comprises a trough 111 and a collection receptacle 112 in order to treat and anneal the insulation covering the tinsel conductor 14.

The upstream end of the water trough 111 is spaced a predetermined distance, "d", from the downstream end of the extruder crosshead 41. The cooling system is mounted so that it may be moved closer or farther from the extruder 33. Changing "d" changes the outside diameter of the insulated conductor 14 and the length of the cone of drawdown, and affects the crystallization rate of the copolymer.

It is to be understood that the above-described arrangements are simply illustrative of the invention. Other arangements may be devised by those skilled in the art which will embody the principles of the invention and fall within the spirit and scope thereof.

What is claimed is:

1. A method of extruding a crystalline plastic material, said method including the steps of:
   determining the thermal energy which is released by a sample of the plastic material over a predetermined temperature range at the onset of crystallization as the sample of the plastic material is cooled after having been melted, cooled and remelted; then
   providing a die having an exit orifice which communicates through a land of the die with a cavity of the die and a core tube having a free end recessed within the land of the die and having a passageway aligned within the die orifice;
   providing a flow passage for the plastic material between a wall which defines the die cavity and an outer surface of the core tube, said flow passage converging to the die land and being configured in accordance with the relative value of the thermal energy which is released by the plastic material at the onset of crystallization;

advancing a conductor along a path through the passageway of the core tube and the die orifice;

flowing the plastic material along the flow passage and through the die orifice; and controlling the step of advancing the conductor to control the drawdown of the plastic material on the conductor.

2. The method of claim 1, wherein the flow passage diverges, then abruptly converges to the land for a plastic material having a relatively low onset crystallization energy.

3. The method of claim 1, which also includes the step of cooling the plastic material after the plastic material is moved out of the orifice of the die, said step of cooling being accomplished in a manner to control the crystallization.

4. The method of claim 1, wherein the flow passage converges gradually to the land for a plastic material having a relatively high onset crystallization energy.

5. The method of claim 1, wherein the step of determining the energy of the plastic material is accomplished in an environment comprising static air.

6. The method of claim 5, wherein said method also includes the steps of heating the sample of the plastic material to a predetermined temperature, cooling the plastic material at a predetermined rate and then reheating and recooling the plastic material, the step of determining the thermal energy which is released being accomplished as the plastic material is recooled.

7. The method of claim 6, wherein said step of cooling is accomplished at a rate of 30±5° C. per minute.

8. The method of claim 6, wherein the plastic material is heated and reheated to a temperature of 270° C.

9. The method of claim 6, wherein the plastic material is heated and reheated at a rate of 10±1° C. per minute.

10. The method of claim 6, wherein said method includes generating a curve which depicts the heat flow of the plastic material as the plastic material is cooled after having been reheated and for determining an area under the curve between a temperature at which the onset of crystallization occurs and a temperature which is 15° C. lower, said area being representative of the energy released during crystallization and indicative of the crystallization characteristics of the plastic material.

* * * * *